United States Patent
Uwazumi et al.

(10) Patent No.: US 6,589,669 B2
(45) Date of Patent: Jul. 8, 2003

(54) MAGNETIC RECORDING MEDIUM AND MANUFACTURING METHOD FOR THE SAME

(75) Inventors: Hiroyuki Uwazumi, Nagano (JP); Tadaaki Oikawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/791,949

(22) Filed: Feb. 23, 2001

(65) Prior Publication Data
US 2001/0023032 A1 Sep. 20, 2001

(30) Foreign Application Priority Data
Feb. 23, 2000 (JP) .......................... 2000-046472

(51) Int. Cl.[7] .............. G11B 5/66; G11B 5/70; B05D 5/12; C23C 14/34; C23C 14/06
(52) U.S. Cl. .............. 428/611; 428/336; 428/667; 428/694 TS; 428/694 TP; 428/900; 427/128; 427/131; 204/192.2
(58) Field of Search .......................... 428/694 TS, 611, 428/65.3, 65.4, 65.5, 65.7, 667, 900, 694 TP, 336; 204/192.15, 192.2; 427/128, 131

(56) References Cited

U.S. PATENT DOCUMENTS 6,324,035 B2 * 11/2001 Shiroishi ............... 360/317

FOREIGN PATENT DOCUMENTS

| JP | 10-146843 | 6/1998 |
| JP | 11-154320 | 6/1999 |

* cited by examiner

Primary Examiner—Holly Rickmon
(74) Attorney, Agent, or Firm—Darby & Darby

(57) ABSTRACT

A magnetic recording medium according to the invention includes a plastic substrate, a non-magnetic under-layer on the substrate, a magnetic layer including cobalt on the under-layer, a protective film on the magnetic layer, and a liquid lubricant layer on the protective film. The under-layer is composed of a chromium alloy having a body centered cubic lattice structure, and containing at least one element selected from the group consisting of Zr, Nb, Mo, Ru and Pd in a total amount of at least 15 at %, or containing at least one element selected from the group consisting of Hf, Ta, W, Re, Pt and Au in a total amount of at least 10 at %. The amount of cobalt dissolved out of the magnetic layer is limited by performing sputtering deposition of at least the magnetic layer at low pressures of argon.

13 Claims, 3 Drawing Sheets

MAGNETIC RECORDING MEDIUM AND MANUFACTURING METHOD FOR THE SAME

BACKGROUND

The present invention relates to a magnetic recording medium installed in various magnetic recording devices including an external memory of a computer, and to a manufacturing method therefor.

Non-magnetic substrates of magnetic recording media for magnetic recording devices conventionally employ an aluminum alloy substrate with electroless NiP plating or a glass substrate. So-called plastic substrates using plastic resin have been proposed for use as non-magnetic substrates of magnetic recording medium, as disclosed in Japanese Unexamined Patent Application Publication (KOKAI) No. H10-146843, for example. The plastic substrates, which can be manufactured economically and in a great mass by injection molding, are very promising for non-magnetic substrates of magnetic recording media that require further cost reduction.

When the plastic substrate is utilized as a non-magnetic substrate of a magnetic recording medium, since the temperature which the plastic substrate can withstand is low, at most below 200° C., it is not acceptable to heat the plastic substrate to several hundred degrees Centigrade prior to depositing functional layers on the substrate. This temperature limitation is quite different from conventional substrates of aluminum alloy or glass. Accordingly, methods have been proposed to attain desired magnetic properties and electromagnetic conversion characteristics even with low temperature deposition. One example of such a method, as disclosed in Japanese Patent No. 2763165, employs a so-called granular magnetic layer. The granular magnetic layer is composed of a structure in which a grain of magnetic substance is surrounded by non-magnetic and non-metallic substances such as oxides or nitrides. In another example, disclosed in Japanese Unexamined Patent Application Publication (KOKAI) No. H11-154320, elevated argon gas pressure is employed in the process of depositing a granular magnetic layer by sputtering.

A magnetic recording device using a flying magnetic head must maintain a narrow gap between a magnetic recording medium and the head as small as a few tens of nanometers. Therefore, durability of the device is greatly affected by the friction and wear characteristic of the head-medium interface. To improve the friction and wear characteristic with a head, the surface of the medium is generally coated with liquid lubricant having a molecular weight of several thousands. It is known that the liquid lubricant on the medium surface can be dissolved as a result of cobalt atoms occasionally precipitated from the magnetic layer. Loss of the liquid lubricant results in significant deterioration of durability of the medium. A protective layer is conventionally deposited between the magnetic layer and the liquid lubricant for suppressing the precipitation of cobalt atoms. Control of thickness and quality of the protective layer and control of surface roughness of the medium are essential.

OBJECTS AND SUMMARY OF THE INVENTION

An object of the present invention is to provide a magnetic recording medium utilizing a plastic substrate, the medium exhibiting excellent magnetic property and an electromagnetic transformation characteristic, and at the same time, superior durability, and to provide a method for manufacturing such a recording medium.

Studies by inventors of the present invention revealed that the cobalt atoms contained in the magnetic layer of a magnetic recording medium readily precipitate on the medium surface when the medium is manufactured by the same method as is conventionally used with an aluminum alloy substrate or a glass substrate. The quantity of precipitated cobalt atoms is particularly large when the granular magnetic layer is employed as a magnetic layer, or when argon gas of elevated pressure is used in the sputtering process for attaining favorable magnetic property and electromagnetic conversion characteristics. The cobalt atoms, precipitated on the medium surface, decompose the molecules of the liquid lubricant on the medium surface, and thus deteriorate the resistance of the medium to friction and wear.

The inventors of the present invention made numerous studies for solving the above-described problems and have found that the amount of cobalt dissolved out and precipitated onto the medium surface strongly correlates with the material and the thickness of the under-layer of a magnetic recording medium.

More specifically, a magnetic recording medium of the present invention based on the above-described finding comprises a non-magnetic substrate made of plastic resin such as polycarbonate or polyolefin, a non-magnetic under-layer, a magnetic layer including cobalt, a protective film, and a liquid lubricant layer sequentially laminated on the substrate. The non-magnetic under-layer is composed of a chromium alloy that has a crystal structure of a body centered cubic lattice, and contains at least one element selected from the group consisting of Zr, Nb, Mo, Ru and Pd in a total amount of 15 at % or more.

In another aspect of the embodiments of the present invention, the non-magnetic under-layer is composed of a chromium alloy that has a crystal structure of a body centered cubic lattice, and contains at least one element selected from the group consisting of Hf, Ta, W, Re, Pt and Au in a total amount of 10 at % or more.

In a magnetic recording medium of the invention, an amount of cobalt dissolved out and precipitated onto the medium surface (also called simply 'dissolved-out cobalt') is 15 $\mu g/m^2$ or less. After exposing the medium to a high temperature and high humidity environment of 85° C. and 80% relative humidity for 96 hours, the amount of dissolved-out cobalt is 20 $\mu g/m^2$ or less.

Thickness of the non-magnetic under-layer of the medium is preferably from 5 nm to 15 nm.

The inventors have further found that controlling argon gas pressure in at least one of the processes for depositing the magnetic layer and depositing the under-layer is effective to prevent the cobalt atoms from dissolving-out and precipitation onto the medium surface.

More specifically, a method for manufacturing a magnetic recording medium according to the present invention comprises a step for forming a non-magnetic under-layer on a non-magnetic substrate of plastic resin, a step for forming a magnetic layer on the under-layer, a step for forming a protective film on the magnetic layer, and a step for forming a liquid lubricant layer on the protective film. In the method, the non-magnetic under-layer is composed of a chromium alloy having a crystal structure of a body centered cubic lattice. The chromium alloy contains at least one element selected from the group consisting of Zr, Nb, Mo, Ru and Pd in a total amount of 15 at % or more, or contains at least one element selected from the group consisting of Hf, Ta, W, Re, Pt and Au in a total amount of 10 at % or more.

The step for forming an under-layer is preferably performed by sputtering under gas pressure of 30 mTorr or less. The step for forming a magnetic layer is preferably performed by sputtering under gas pressure of 15 mTorr or less. Most preferably, both of the gas pressure conditions are employed, that is, the step for forming an under-layer is performed by sputtering under gas pressure of 30 mTorr or less and the step for forming a magnetic layer is performed by sputtering under gas pressure of 15 mTorr or less.

Aspect of Embodiments of the Invention

The present invention will now be described in detail in the following with reference to a drawing.

FIG. 1 is a schematic cross-sectional view of a magnetic recording medium of the invention. Referring to FIG. 1, a magnetic recording medium of the invention comprises a plastic non-magnetic substrate 1, a non-magnetic under-layer 2, a magnetic layer 3, a protective film 4, and a liquid lubricant layer 5 sequentially formed on the substrate 1 in this order.

Meanwhile, the phrase "quantity of cobalt dissolved out and precipitated onto the medium surface" is a value obtained by measuring the quantity of cobalt extracted by oscillating a sample of a magnetic recording medium in 50 ml of pure water for 3 min by means of ICP (inductively coupled plasma) emission spectroscopy. The measured value is represented by a mass of the cobalt per unit area of the medium surface in the unit $\mu g/m^2$.

A plastic substrate is employed as a non-magnetic substrate in the invention. The plastic substrate may be produced by injection molding polycarbonate resin or polyolefin resin, for example.

Initially, a non-magnetic under-layer 2 is formed on the plastic substrate 1. The material used for the under-layer is an alloy containing chromium as a major component and having a body centered cubic crystal structure in order to control the crystal structure of the magnetic layer 3. This chromium alloy contains at least one 4d transition metal element selected from a group consisting of Zr, Nb, Mo, Ru and Pd in a total amount of 15 at % or more. Alternatively, the chromium alloy contains at least one 5d transition metal element selected from the group consisting of Hf, Ta, W, Re, Pt and Au in a total amount of 10 at % or more.

The maximum quantity of the additives that retain the chromium alloy within a body centered cubic structure depends on the element to be added, which imposes a restriction on the maximum quantity of each additive element.

When the protective film 4 is thin or the film does not thoroughly cover the magnetic layer 5 due to large roughness of the magnetic layer, the cobalt atom in the magnetic layer generally tend to dissolve-out and precipitate onto the surface of the magnetic layer from the portion of the magnetic layer without the protective film or from inside of the magnetic layer by ordinal diffusion process through the thin protective film. However, even when the protective film appropriately covers the magnetic layer, according to the inventors' findings, the cobalt atom in the magnetic layer may dissolve-out and precipitate onto the surface of the recording medium due to electrochemical reaction in the magnetic layer and at the boundary between the magnetic layer and the under-layer. Namely, the electrochemical reaction generates OH ions and Co ions, the former is originated from water molecules, and/or hydrogen atoms and oxygen atoms which are included during deposition of the layers or invaded into the layers by diffusion through the protective film after the deposition of the layers. The ionized cobalt atoms easily diffuse to the medium surface with the aid of OH ions through formation of a hydroxide with cobalt, resulting in enhanced amount of dissolved-out cobalt. Moreover, the electrochemical reaction, which makes the cobalt atom in the alloy lattice to dissolve-out, is strongly affected by the structure, particularly compactness and density not only of the magnetic layer, but also of the under-layer. That is, the under-layer with high compactness and density can suppress the electrochemical reaction and decreases quantity of dissolved-out cobalt. The addition of at least one transition metal elements as described earlier has been found to provide favorable structure of the layer for suppressing the electrochemical reaction and resulting to lowered quantity of dissolved-out cobalt, to obtain a magnetic recording medium exhibiting high durability using a plastic substrate.

The non-magnetic under-layer is advantageously deposited by sputtering process using argon gas under gas pressure of 30 mTorr or less. By employing such a process, compactness of the under-layer enhances and dissolving-out of cobalt atoms onto the medium surface is further suppressed.

Thickness of the under-layer of the invention is preferably in the range from 5 nm to 15 nm. If the thickness is less than 5 nm, a magnetic characteristic abruptly degrades with decrease of the thickness, while if thickness is more than 15 nm, an amount of the precipitating cobalt excessively increases.

On the under-layer 2, a magnetic layer 3 is formed. The magnetic layer is preferably a granular magnetic layer for attaining favorable magnetic property and an electromagnetic transformation characteristic because the granular magnetic layer provides a magnetic layer of excellent magnetic property even with low temperature deposition. However, the magnetic layer may also be composed of a Co—Cr alloy conventionally used together with an aluminum alloy substrate or a glass substrate.

The magnetic layer 3 is advantageously deposited by sputtering process using argon gas under gas pressure of 15 mTorr or less on the under-layer 2. By employing such a gas pressure condition, compactness of the under-layer enhances and precipitation of cobalt atoms onto the medium surface is further suppressed.

On the magnetic layer 3, a protective film 4 is formed. The protective film is a thin film including carbon as a principal component although not limited to this material. The protective layer is deposited by a commonly used sputtering process, for example.

On the protective film 4, a liquid lubricant layer 5 is formed. The liquid lubricant layer is formed of perfluoropolyether lubricant although not limited to this material.

The thus obtained magnetic recording medium of the invention exhibits excellent magnetic property and an electromagnetic transformation characteristic. The quantity of cobalt dissolved out and precipitated onto the surface of the magnetic recording medium is 15 $\mu g/m^2$ or less. After exposing the medium to a high temperature and humidity environment of 85° C. and 80% relative humidity for 96 hours, the amount of dissolved-out cobalt is 20 $\mu g/m^2$ or less. Thus, the magnetic recording medium of the invention performs satisfactorily in long-term reliability.

The sputtering process for depositing the under-layer is conducted under an argon gas pressure of 30 mTorr or less. The sputtering process for depositing the magnetic layer is conducted under an argon gas pressure of 15 mTorr or less, as described above. Although only one of the two gas pressure conditions is effective, employing both of the two conditions brings about the most favorable result.

The magnetic recording medium of the invention may further include an intermediate layer between the magnetic layer 3 and the under-layer 2. The intermediate layer is a so-called seed-layer between the substrate and the under-layer, if required.

There is no particular restriction for material or thickness of the layers in the medium except for the under-layer, and commonly used material and thickness may be appropriately selected.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
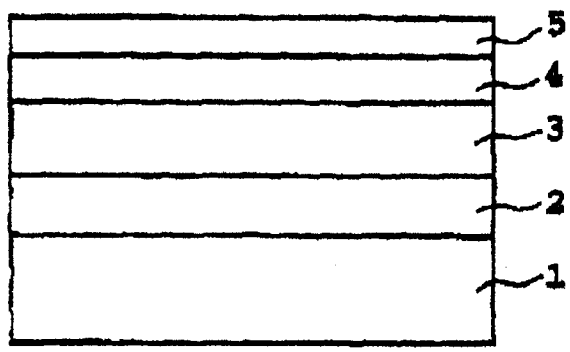
FIG. 1 is a schematic cross-sectional view of a magnetic recording medium according to an embodiment of the invention.

Referring to FIG. 1, a magnetic recording medium according to the present invention is a multi-layer device which can have any convenient peripheral shape. For present purposes, it is conventional to use a disk shape in order to adapt the magnetic recording medium to use in a hard disk drive of a personal computer. In other applications, the magnetic recording medium may be rectangular, or in some other shape.

A non-magnetic substrate 1, of injection-molded polycarbonate resin, has a non-magnetic under-layer 2 deposited thereon. A magnetic layer 3 is deposited on the non-magnetic under-layer 2. A carbon protective layer 4 is deposited on the magnetic layer 3. A lubricant layer 5, atop the protective layer 4, completes the recording medium. The characteristics of the above layers will become evident from the following examples and comparative examples.

EXAMPLE 1

A non-magnetic substrate 1, of polycarbonate, was prepared and introduced into a sputtering apparatus. Without heating the substrate, a sputtering process was conducted using a chromium alloy as a target material under an argon gas pressure of 30 mTorr to form a chromium alloy under-layer 2 having a thickness of 15 nm. The composition of the chromium alloy under-layer is shown in Table 1. Two specimens were fabricated for each of the compositions.

Then, a magnetic layer 3 was formed by a sputtering process with $(Co_{78}Cr_{10}Pt_{12})_{90}$—$(Cr_2O_3)_{10}$ as a target material under an argon gas pressure of 15 mTorr. The magnetic layer had the composition of $(Co_{78}Cr_{10}Pt_{12})_{90}$—$(Cr_2O_3)_{10}$ with a thickness of 25 nm.

Subsequently, a carbon protective film 4 having thickness of 10 nm was formed on the magnetic layer 3 by a sputtering process using a carbon target under an argon gas pressure of 10 mTorr. The resulting laminate was removed from the vacuum of the sputtering apparatus.

A liquid lubricant layer 5 having a thickness of 1.5 nm was formed by coating the carbon protective film 4 with a liquid lubricant of perfluoropolyether.

Thus, a magnetic recording medium as shown in FIG. 1 was fabricated.

Measurement of the quantity of cobalt dissolved out and precipitated onto the medium surface was made for pairs of the obtained media having under-layers of the same composition. One specimen of each pair was tested as-fabricated. The other of each pair was exposed to a high temperature and humidity environment of 85° C. and 80% relative humidity for 96 hours before testing. The measurement was conducted by means of ICP emission spectroscopy, in which the cobalt was extracted by oscillating the specimen of the magnetic recording medium in 50 ml of pure water for 3 min. Table 1 gives the measured quantity of cobalt dissolved out and precipitated onto the medium surface in $\mu g/m^2$.

COMPARATIVE EXAMPLE 1

A series of magnetic recording media were produced in the same manner as in Example 1 except that the composition of the under-layer of each pair of the media was changed to the composition shown in Table 2.

The measurement of the quantity of cobalt dissolved out and precipitated onto the medium surface was made for the magnetic recording media of Comparative Example 1 in the same manner as in Example 1.

The results are given in Table 2.

TABLE 1

| under-layer composition | high temp. & humid. (1) | dissolved-out cobalt (2) ($\mu g/m^2$) |
|---|---|---|
| Cr-15 at % Zr | NO | 14.3 |
|  | YES | 19.8 |
| Cr-15 at % Nb | NO | 12.8 |
|  | YES | 19.2 |
| Cr-15 at % Mo | NO | 13.4 |
|  | YES | 18.3 |
| Cr-25 at % Mo | NO | 8.8 |
|  | YES | 13.2 |
| Cr-15 at % Ru | NO | 10.3 |
|  | YES | 15.5 |
| Cr-15 at % Pd | NO | 11.2 |
|  | YES | 16.8 |
| Cr-10 at % Hf | NO | 12.5 |
|  | YES | 18.8 |
| Cr-10 at % Ta | NO | 10.3 |
|  | YES | 15.5 |
| Cr-10 at % W | NO | 9.9 |
|  | YES | 14.9 |
| Cr-10 at % Re | NO | 9.3 |
|  | YES | 14.0 |
| Cr-10 at % Pt | NO | 8.4 |
|  | YES | 12.6 |
| Cr-10 at % Au | NO | 10.5 |
|  | YES | 15.8 |

(1) storing in 85° C. and 80% RH for 96 hr
(2) quanity of cobalt dissolved-out and precipitated onto medium surface

TABLE 2

| under-layer Composition | high temp. & humid. (1) | dissolved-out cobalt (2) ($\mu g/m^2$) |
| --- | --- | --- |
| Cr | NO | 88.5 |
| | YES | 203.6 |
| Cr-5 at % Mo | NO | 42.1 |
| | YES | 96.8 |
| Cr-10 at % Mo | NO | 25.7 |
| | YES | 59.1 |
| Cr-5 at % Ta | NO | 30.5 |
| | YES | 70.2 |
| Cr-5 at % W | NO | 37.6 |
| | YES | 86.5 |

(1) storing in 85° C. and 80% RH for 96 hr
(2) quanity of cobalt dissolved-out and precipitated onto surface As is apparent from Table 1, the quantity of cobalt dissolved out and precipitated onto the medium surface is not more than 15 $\mu g/m^2$ for the as-fabricated medium and not more than 20 $\mu g/m^2$ after the medium experienced high temperature and humidity, when the under-layer of the medium is composed of a chromium alloy containing 15 at % or more of Zr, Nb, Mo, Ru, or Pd or a chromium alloy containing 10 at % or more of Hf, Ta, W, Re, Pt or Au.

In contrast, as shown in Table 2, when the under-layer 2 is composed of pure chromium metal or a chromium alloy containing an additive in a smaller amount than defined in the present invention, the quantity of dissolved-out cobalt significantly increases. Thus, it has been demonstrated that the use of the chromium alloy defined by the present invention is effective to suppress the quantity of cobalt dissolved out and precipitated onto the medium surface.

EXAMPLE 2

A series of magnetic recording media having the basic structure of FIG. 1 comprising under-layers composed of Cr-15 at % Nb, Cr-15 at % Mo, and Cr-10 at % W were fabricated. The thickness of the under-layer of each of the compositions was varied in the range from 2 nm to 30 nm. The sputtering process for depositing the under-layer was conducted under an argon gas pressure of 25 mTorr. Other materials and processes were the same as in Example 1.

Figure 2:
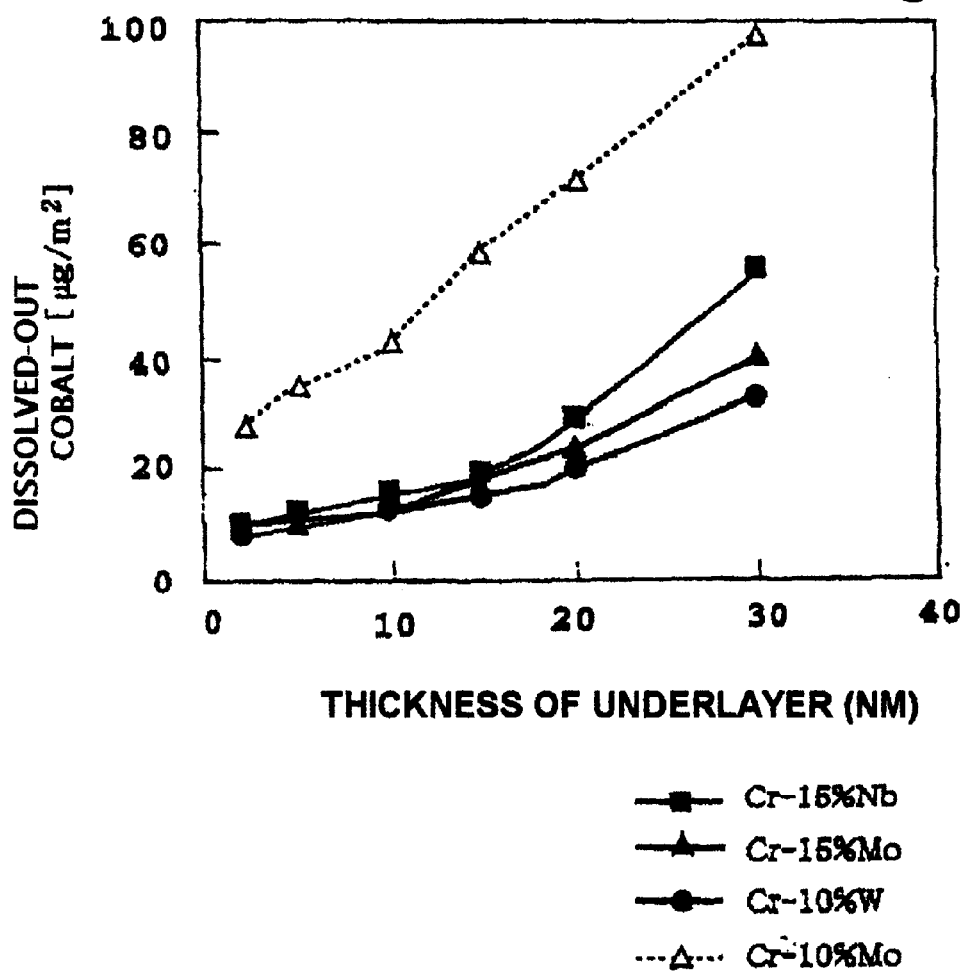
FIG. 2 is a graph showing the quantity of cobalt dissolved out and precipitated onto the surface of the magnetic recording medium during storage in a high temperature and humidity environment of 85° C. and 80% relative humidity for 96 hours, as functions of the thickness of the chromium alloy under-layer.

Measurement of the quantity of dissolved-out cobalt was made in the same way as in Example 1 for each of the obtained media after exposure to a high temperature and humidity environment of 85° C. and 80% relative humidity for 96 hours. The results are shown in FIG. 2.

Figure 3:
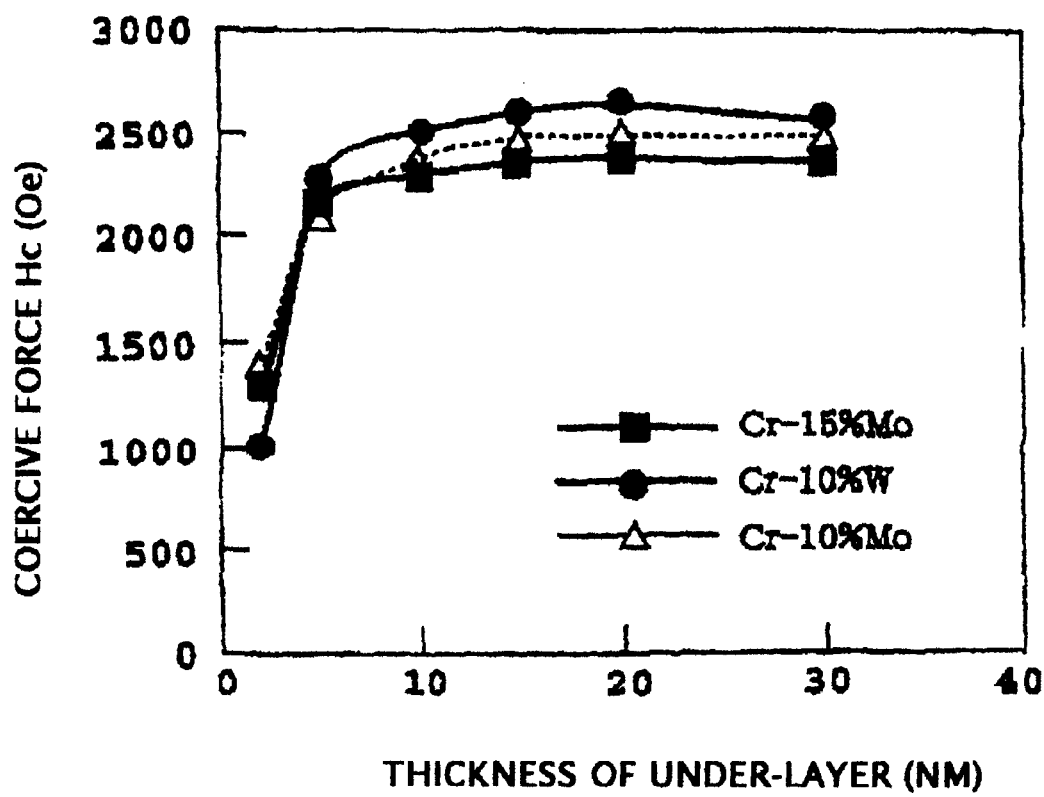
FIG. 3 is a graph showing coercive force of the magnetic recording medium as functions of the thickness of the chromium alloy under-layer.

Measurement of coercive force Hc was made for each of the obtained media by means of VSM (vibrating sample magnetometer). The results are shown in FIG. 3.

COMPARATIVE EXAMPLE 2

A series of magnetic recording media as shown in FIG. 1 were fabricated in the same manner as in Example 2 except that the under-layer was composed of Cr-10 at % Mo.

Measurement of the quantity of dissolved-out cobalt was made in the same way as in Example 1 for each of the obtained media. The results are given in FIG. 2. The magnetic property was also measured in the same way as in Example 2. The result is given in FIG. 3.

As shown in FIG. 2, the quantity of dissolved-out cobalt tends to increase with increasing thickness of the under-layer. However, the quantity of dissolved-out cobalt is suppressed to the relatively low value of 20 $\mu g/m^2$ or less when the medium has an under-layer within the limitation of the invention that is composed of Cr-15 at %/Nb, Cr-15 at % Mo or Cr-10 at % W and with a thickness of 15 nm or less. In contrast, the medium comprising the under-layer of Cr-10 at % Mo shows sharp increases in the quantity of dissolved-out cobalt with increasing thickness of the layer.

In order that the quantity of dissolved-out cobalt from a magnetic recording medium that is exposed to the high temperature and humidity environment of 85° C. and 80% relative humidity for 96 hours be suppressed to 20 $\mu g/m^2$ or less, it has been shown necessary that the medium comprises the under-layer of chromium alloy within the limitation of the present invention and the thickness of the under-layer is 15 nm or less.

As shown in FIG. 3, the coercive force Hc, which is essential for a magnetic recording medium, decreases rapidly when the thickness of the under-layer decreases below 5 nm. Therefore, the thickness of the under-layer must to be at least 5 nm.

EXAMPLE 3

A series of magnetic recording media having the basic structure of FIG. 1 and comprising the under-layer of Cr-15 at % Mo having thickness of 15 nm were fabricated in the same manner as in Example 1 except that the argon gas pressure in the process for depositing the under-layer was varied in the range from 20 mTorr to 50 mTorr, and in the process for depositing the magnetic layer in the range from 5 mTorr to 30 mTorr.

Measurement of the quantity of dissolved-out cobalt was made in the same way as in Example 1 for each of the obtained media after exposure to a high temperature and humidity environment of 85° C. and 80% relative humidity for 96 hours. The results are shown in FIG. 4.

Figure 4:
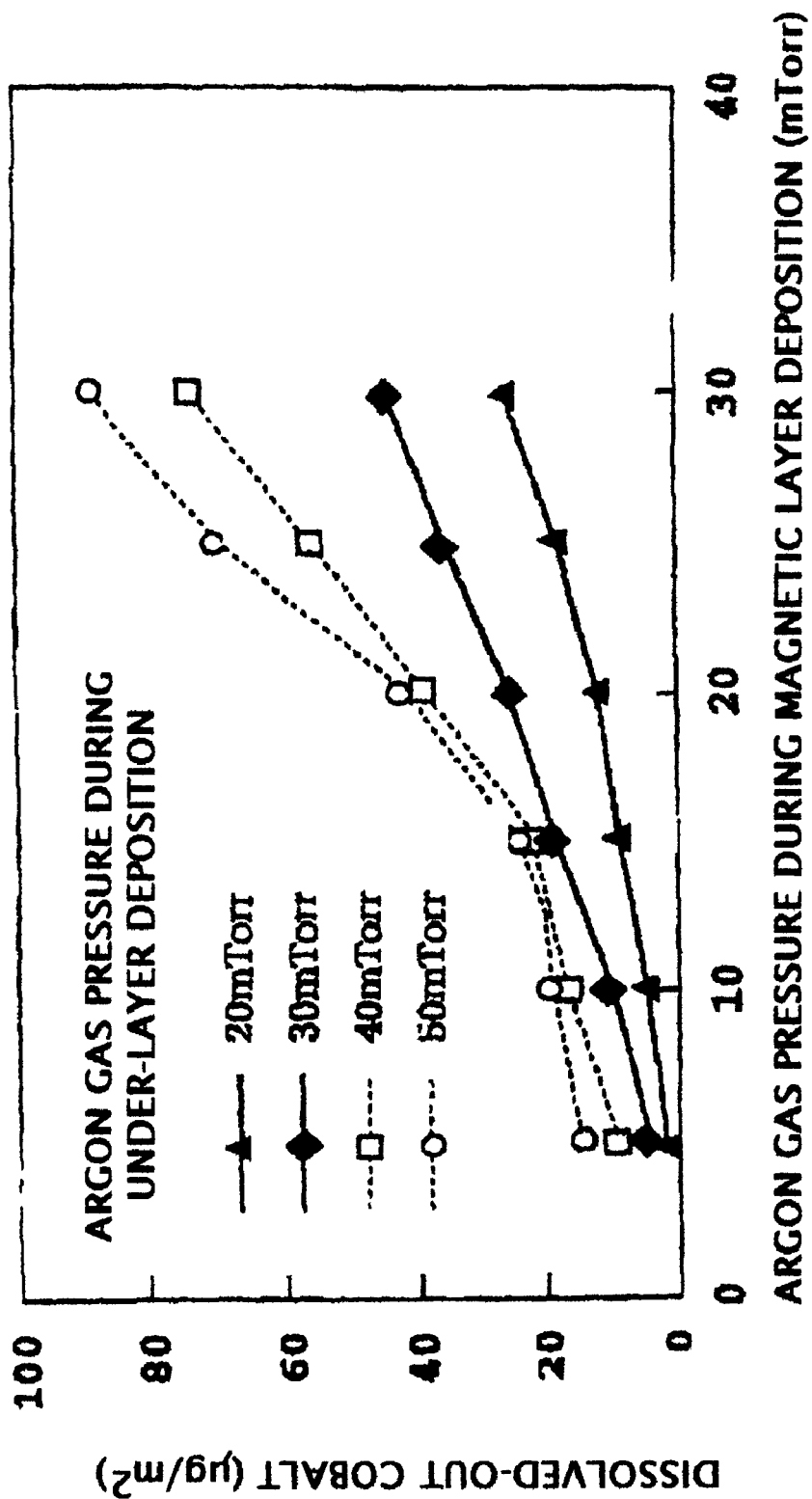
FIG. 4 is a graph showing the quantity of cobalt dissolved out and precipitated onto the surface of the magnetic recording medium during storage in a high temperature and humidity environment of 85° C. and 80% relative humidity for 96 hours, as functions of the argon gas pressure in each of the processes of depositing the chromium alloy under-layer and depositing the magnetic layer.

As shown in FIG. 4, the quantity of dissolved-out cobalt strongly depends on the argon gas pressure during the processes for depositing the under-layer and the magnetic layer. That is, the quantity of dissolved-out cobalt increases rapidly with increases in the argon gas pressure during the deposition of these layers. The quantity of dissolved-out cobalt is considerably reduced when the argon gas pressure in the process for depositing the magnetic layer is not more than 15 mTorr or the gas pressure in the process for depositing the under-layer is not more than 30 mTorr. When both conditions for gas pressure are satisfied at the same time, namely, the gas pressure in the magnetic layer deposition is 15 mTorr or less and the gas pressure in the under-layer deposition is 30 mTorr or less, the quantity of dissolved-out cobalt after exposure to the high temperature and humidity environment of 85° C. and 80% relative humidity for 96 hours is not more than 20 $\mu g/m^2$, a satisfactorily small value.

A magnetic recording medium of the invention employs a non-magnetic under-layer composed of a chromium alloy having a body centered cubic lattice structure and containing at least one element selected from Zr, Nb, Mo, Ru and Pd in a total amount of 15 at % or more, or selected from Hf, Ta, W, Re, Pt and Au in a total amount of 10 at % or more. The quantity of cobalt dissolved out and precipitated onto the medium surface of such a recording medium is suppressed to 20 $\mu g/m^2$ or less even after exposure to the high temperature and humidity environment of 85° C. and 80% relative humidity for 96 hours. Thus, a magnetic recording medium exhibiting satisfactory long-term reliability is obtained.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium, comprising:
   a plastic substrate;
   a non-magnetic under-layer on said substrate;
   said non-magnetic under-layer being a chromium alloy;
   said chromium alloy having a body centered cubic lattice structure and containing at least one element selected from the group consisting of Zr, Nb, Mo, Ru and Pd in a total amount of 15 at % or more;
   a magnetic layer including cobalt on said under-layer;
   a protective film on said magnetic layer; and
   a liquid lubricant layer on said protective film; wherein an amount of said cobalt is dissolved out and precipitated onto a surface of said medium, said amount being 15 $\mu g/m^2$ or less.

2. A magnetic recording medium, comprising:
   A plastic substrate;
   a non-magnetic under-layer on said substrate;
   said non-magnetic under-layer being a chromium alloy;
   said chromium alloy having a body centered cubic lattice structure and containing at least one element selected from the group consisting of Hf, Ta, W, Re, Pt and Au in a total amount of at least 10 at %;
   a magnetic layer including cobalt on said under-layer;
   a protective film on said magnetic layer; and
   a liquid lubricant layer on said protective film; wherein an amount of said cobalt is dissolved out and precipitated onto a surface of said medium, said amount being 15 $\mu g/m^2$ or less.

3. A magnetic recording medium according to claim 1, wherein a thickness of said under-layer is from 5 nm to 15 nm.

4. A magnetic recording medium according to claim 2, wherein a thickness of said under-layer is from 5 nm to 15 nm.

5. A method for manufacturing a magnetic recording medium, comprising the steps of:
   forming a non-magnetic under-layer composed of a chromium alloy on a plastic substrate;
   said chromium alloy having body centered cubic lattice structure and containing at least one element selected from the group consisting of Zr, Nb, Mo, Ru and Pd in a total amount of 15 at % or more;
   forming a magnetic layer including cobalt on said under-layer;
   forming a protective film on said magnetic layer; and
   forming a liquid lubricant layer on said protective film wherein an amount of said cobalt is dissolved out and precipitated onto a surface of said medium, said amount being 15 $\mu g/m^2$ or less.

6. A method for manufacturing a magnetic recording medium, comprising the steps of:
   forming a non-magnetic under-layer composed of a chromium alloy on a plastic substrate;
   said chromium alloy having body centered cubic lattice structure and containing at least one element selected from the group consisting of Hf, Ta, W, Re, Pt and Au in a total amount of 10 at % or more;
   forming a magnetic layer including cobalt on said under-layer;
   forming a protective film on said magnetic layer; and
   forming a liquid lubricant layer on said protective film wherein an amount of said cobalt is dissolved out and precipitated onto a surface of said medium, said amount being 15 $\mu g/m^2$ or less.

7. A method for manufacturing a magnetic recording medium according to claim 5, wherein said step for forming said under-layer comprises a sputtering process under gas pressure of 30 mTorr or less.

8. A method for manufacturing a magnetic recording medium according to claim 6, wherein said step for forming said under-layer comprises a sputtering process under gas pressure of 30 mTorr or less.

9. A method for manufacturing a magnetic recording medium according to claim 5, wherein said step for forming said magnetic layer comprises a sputtering process under gas pressure of 15 mTorr or less.

10. A method for manufacturing a magnetic recording medium according to claim 6, wherein said step for forming said magnetic layer comprises a sputtering process under gas pressure of 15 mTorr or less.

11. A method for manufacturing a magnetic recording medium comprising:
    depositing a non-magnetic under-layer on a resin substrate;
    depositing a magnetic layer containing cobalt on said under-layer;
    depositing a protective layer on said magnetic layer;
    depositing a lubricating layer on said protective layer;
    dissolving out and precipitating an amount of said cobalt onto a surface of said medium, said amount being 15 $\mu g/m^2$ or less,
    the step of depositing an under-layer is performed in an argon gas atmosphere at a first pressure;
    the step of depositing a magnetic layer is performed in an argon gas atmosphere at a second pressure; and
    at least one of said first and second pressures is controlled to a value which limits dissolved-out cobalt to 15 $\mu g/m^2$ or less.

12. A method for manufacturing a magnetic recording medium comprising:
    depositing a non-magnetic under-layer on a resin substrate;
    depositing a magnetic layer containing cobalt on said under-layer;
    depositing a protective layer on said magnetic layer;
    depositing a lubricating layer on said protective layer;
    dissolving out and precipitating an amount of said cobalt onto a surface of said medium, said amount by 15 $\mu g/m^2$ or less;
    the step of depositing an under-layer is performed in an argon gas atmosphere at a first pressure;
    the step of depositing a magnetic layer is performed in an argon has atmosphere at a second pressure; and
    at least one of said first and second pressures is controlled to a value which limits dissolved-out cobalt to 15 $\mu g/m^2$ or less;
    wherein said at least one includes controlling only said second pressure.

13. A process according to claim 11, wherein said at least one includes controlling both said first and second pressures.

* * * * *